INVENTOR
Kenneth C. Miller
ATTORNEY

Nov. 21, 1961 K. C. MILLER 3,010,041
DYNAMOELECTRIC MACHINE
Filed Nov. 21, 1958 2 Sheets-Sheet 2

United States Patent Office 3,010,041
Patented Nov. 21, 1961

3,010,041
DYNAMOELECTRIC MACHINE
Kenneth C. Miller, Shawnee Township, Allen County, Ohio, assignor to Westinghouse Electric Corporation, East Pittsburgh, Pa., a corporation of Pennsylvania
Filed Nov. 21, 1958, Ser. No. 775,432
5 Claims. (Cl. 310—194)

The present invention relates to alternating current dynamoelectric machines, and more particularly relates to a new and improved stator construction resulting in a radially wound machine.

The conventional alternating current machine has axially extending coils disposed in slots within a stator. The coils have useless conductor material in the end turns which contributes little or nothing to the electrical performance of the machine. The conventional end turns not only make the overall dimensions of the stator larger, but markedly decrease the ratio of effective conductor material to total conductor material in any given dynamoelectric machine.

The present invention overcomes the disadvantages of the conventionally wound stator and at the same time allows a much more economical construction resulting in savings of material as well as labor. End turns and the inactive conductor material therein are eliminated. At the same time, the stator winding is very greatly simplified and the usual shaping and taping of the coils, as well as the varnish dip and baking generally used to hold the coils in place are eliminated. Connecting the coils and taping the connections have also been eliminated. It is manifest that conventional windings are quite complicated, expensive, and difficult to wind on the stator.

The advantages of my invention over the usual dynamoelectric machine can be more clearly seen from the objects of my invention.

The principal object of my invention is a dynamoelectric machine of a new and improved construction lending itself readily to automated assembly.

Another object of my invention is a dynamoelectric machine having a stator construction allowing the elimination of end turns.

Another object of my invention is to provide a dynamoelectric machine resulting in a reduction and simplification of the component parts utilized.

Another object of my invention is to provide a dynamoelectric machine having greater utilization of the internal space within the machine enclosure.

Further objects and advantages of my invention will be readily apparent from the following detailed description, taken in conjunction with the following drawings, in which.

Figure 1:
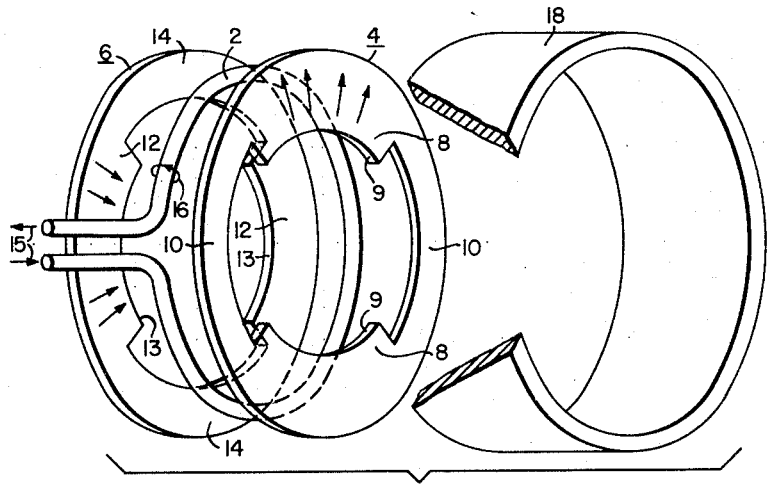
FIGURE 1 is a diagrammatic view illustrating the principles of my invention.
Figure 2:
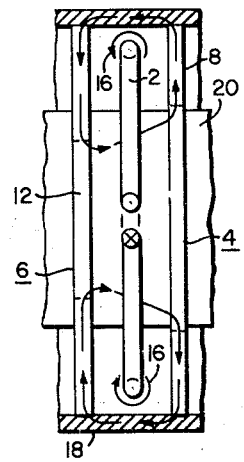
FIG. 2 is a side view of the structure of FIG. 1.
Figure 3:
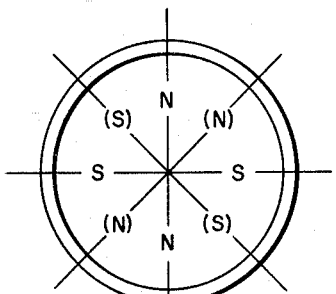
FIG. 3 is a diagram illustrating the location of the magnetic poles.

A theoretical understanding of my invention can best be obtained by initially considering FIGS. 1, 2 and 3. These figures show a coil 2 looped in a circular fashion. Adjacent the coil 2 on each side thereof are magnetic punchings or laminations completing a machine or motor section. For purposes of clarity, the punchings located on the right-hand side of the winding 2 have been designated as 4 while the punchings on the left-hand side of the winding 2 have been designated as 6. This assembly will hereinafter be referred to as a motor section. FIG. 1 shows a four-pole machine in which pole portions 8, shown diametrically opposite each other on the punching 4, are formed on the punching 4 itself. Undercut portions 10 of each punching 4 separate the pole portions 8. Each pole portion 8 is formed to have a pole face 9. In similar fashion, pole portions 12 are formed on the magnetic punching 6 on the opposite side of the coil 2. The pole portions 12 are also separated by undercut portions designated at 14. Each pole portion 12 is formed to have a pole face 13. The punchings 4 and 6 are disposed so that their pole portions are angularly displaced by 90° in the four pole machine shown.

Assuming the flow of current through the coil 2 is as indicated by the arrows 15, a magnetic flux created by the current will have a path within and around the coil 2 as indicated by the circular or closed arrows 16. The flux pattern 16 caused by the flow of current through coil 2 results in a flux path as indicated by the arrows on the pole portions 8 and 12 of the punchings 4 and 6 located on each side of the coil 2, respectively. The flux path within the punchings 4 and 6 is in the same direction as the flux within and around coil 2. The result is that the pole portions 8 on the punching 4 have one polarity while the pole portions 12 on the punching 6 are of opposite polarity. A machine frame 18 is fitted over the punchings 4 and 6 to contain the motor section and also to provide a path for flux from the pole portions 8, which are of like polarity, to the pole portions 12, of opposite polarity. The closed path for the flux flow through the magnetic punchings 4 and 6 as well as the motor frame 18 is completed by the rotor 20 (FIG. 2) which is located the usual air gap distance from the pole faces 9 and 13, and which may be of any usual or desired construction.

The flux path within the machine section illustrated in FIG. 1 can be more easily seen from FIG. 2. As shown in that figure, the current path in the coil 2 results in a magnetic flux pattern as is indicated at 16. The flux pattern 16 induces flux in the magnetic punching 4 with a radially outward path and flux in the magnetic punching 6 in a radially inward path. The flux circuit shown by the arrows is completed by the frame 18 and the rotor 20. In the machine section illustrated in FIG. 2, the pole portions 8 and 12 of opposite polarity are to be considered separated by an axial distance equivalent to the width of the coil 2 and the insulation thickness required to electrically protect the coil 2, although they have been shown more widely separated for clarity.

The magnetic poles of the theoretical illustration of my invention shown in FIGS. 1 and 2 can be clearly seen from the position of the magnetic fields as shown in FIG. 3. The center lines of the similar pole portions 8 on the magnetic punching 4 are designated as north poles N while the center lines of the pole portions 12 formed on the magnetic punching 6 are designated as south poles S and displaced from the north poles by 90 mechanical degrees. (360 degrees divided by the number of poles.) The other set of north and south poles, shown enclosed in brackets, will be discussed later in regard to starting torque means. It is to be noted that the pole portions 8 are separated from the pole portions 12 by an angular separation which will differ with the number of poles of the machine. While a four-pole machine is illustrated, it is to be understood that any number of poles can be had with my invention. The pole portions and pole undercut portions of each punching will be such that the angular space displacement between center lines of adjacent pole portions of opposite polarity is equal to 360 space degrees divided by the total number of poles. The number of poles on each punching is, of course, equal to half the total number of poles, and their angular extent is preferably made equal to 360 degrees divided by the total number of poles.

The single motor section so far described, when energized with alternating current, will have, of course, no starting torque. If starting torque is desired, a second motor section, identical to the first, can be located adjacent the first motor section. The second or auxiliary section is of duplicate construction to the section described in FIGS. 1 and 2 but has its pole portions rotated so as to be angularly located between the poles of the adjacent first or main section. Conventional means such as added resistance or a capacitor, or any other means well known in the art, may provide the current phase displacement in the winding of the second section, thus providing the necessary phase angle to obtain a starting torque. FIG. 3 illustrates the location of the center lines of the auxiliary poles which are located in the interpolar spaces of the main motor section. The auxiliary poles are indicated at (N) and (S).

A second section or auxiliary motor section is thus placed directly alongside the main motor section but has its pole portions of similar polarity to the main section angularly rotated in position by a number of degrees equal to one-half of the space occupied by any given pole portion. It is to be understood, however, that the pole portions on either the main section or the auxiliary section or both sections may be of any desired width or expanse so long as the pole portions of one section are located in the interpolar space of the other section.

It will be easier to visualize the development of starting torque of this machine if it is viewed from the end of the machine, as shown in FIG. 3. The air gap flux induced by the first and second sections will be substantially the same as with the conventionally wound stator. When used with a conventional rotor, torque will be produced in the same manner.

Figure 4:
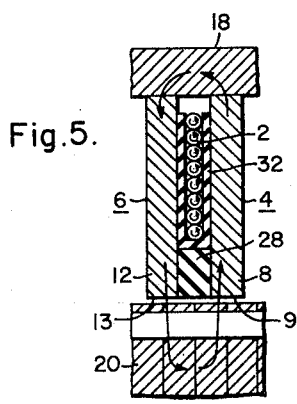
FIG. 4 is a side view, partly in longitudinal section, showing an actual electric motor embodying the invention.

FIG. 4 shows an illustrative embodiment of my invention in a single-phase motor. The stator comprises a stack of sections similar to the motor sections previously described. The main winding sections have been designated at 24 while the auxiliary winding sections are designated at 26. The two groups of sections are axially aligned with each other. The first group of sections 24 comprise the main winding sections while the second group of sections comprise the auxiliary winding sections 26. The sections 24 and 26 are shown alternately stacked in the stator but it is to be understood that any arrangement of sections may be used.

Each section 24 is made up of magnetic punchings 4 and 6 with a spiral wound coil of conductors sandwiched therebetween as indicated at 2. Spacers 28 of annular configuration and made of insulating plastic or other suitable material separate the magnetic punchings on each side of the spiral coil of wire 2. Insulation 32 of any suitable type is laid in the slots between the punchings to separate the windings from the magnetic core.

The two groups of motor sections are contained in the frame 18 of the motor, which may be of any suitable construction and which carries end brackets 34 having hub portions containing suitable bearings 36 which rotatably support the rotor 20 within the stator member. The rotor may be of any suitable type and is shown as a conventional squirrel-cage rotor.

Figure 5:
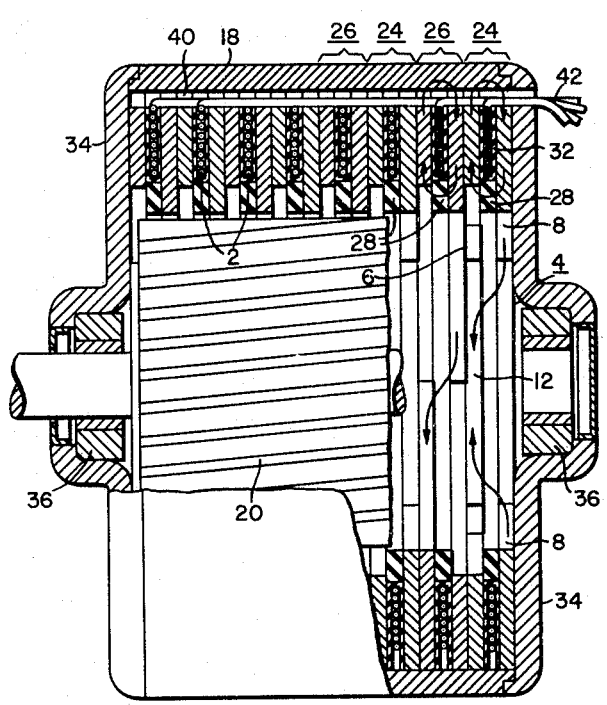
FIG. 5 is an enlarged fragmentary view of a portion of the electric motor shown in FIG. 4.

The pole portions of each section are positioned in the manner indicated in FIGS. 1–3, and as many sections may be used as are needed to provide the required torque. The auxiliary sections 26 have their pole portions angularly rotated to a position between the pole portions of the adjacent main sections 24. The magnetic flux path in section 24 and in section 26 is as indicated by the arrows of FIGS. 4 and 5.

Axial slots 40, formed in the outer periphery of the punchings, extend the entire length of the frame 18. As a result, no special connection between the coils 2 of each section 24 is required since a single continuous conductor can be used to wind the group containing the sections 24. The sections 24 contain the main winding which can comprise a single conductor which is spirally wound between the magnetic punchings 4 and 6 of each section 24, and carried over to the next section 24 of that particular group through the axial extending slot 40. This process can be repeated until all the sections 24 are wound. In a like manner, the auxiliary winding is wound in the group comprising the auxiliary sections 26. Both the single main winding conductor and the single auxiliary winding conductor can then be brought out of the stator as indicated at 42. For the main winding to bridge the intervening auxiliary sections 26 without breaking the continuity of the conductor, the main winding is looped or folded into the adjacent auxiliary section 26. The length of the loop is made sufficient to allow the auxiliary winding when wound on the stator to be placed in its appropriate section by overlapping the loop of the main winding. Of course, any suitable manner of carrying each winding to the next proper section may be used. With such connecting loops the main winding can be wound of a single conductor in the entire group of main sections 24 while the auxiliary winding can be wound of another single conductor in its appropriate group containing the auxiliary sections 26. Other winding arrangements may, of course, be used if desired.

In building the motor, the punchings 4 and 6 are first assembled with the spacers 28 in the proper positions, as shown, and with the electrical insulation 32 in place. The entire stator is placed on a plug or arbor and rotated while the windings are inserted in the proper motor sections 24 and 26. No connections between pole coils or taping are necessary, as in conventional machines, since the axial connecting slot 40 in the punchings is provided to carry the winding conductors. The frame 18 which provides the flux return path is assembled after the winding of the main and auxiliary sections. The rotor 20, end brackets 34, and final connections are than made to complete the motor.

The operation of the motor is as previously described in connection with FIGS. 1 and 2, and is further illustrated in FIG. 5, which is an enlarged fragmentary view of a main motor section 24. It is to be understood, however, that FIG. 5 is equally applicable to an auxiliary section 26. The spiral coil of wire 2 is disposed between the magnetic punchings 4 and 6 which are similar to the punchings of FIG. 1. Insulation 32 separates the sides of the winding 2 from the magnetic punchings 4 and 6. A spacer 28 rigidly positions and separates the magnetic punchings 4 and 6. The punching 4 is shown as having a pole portion 8 while the punching 6 has a pole portion 12. The pole portion 12 has been displaced angularly 90 mechanical degrees from its true position so that FIG. 5 appears to have aligned opposite pole portions 8 and 12. This is done for the purposes of clarity to indicate the flux path. As can be seen from FIG. 5, the flux of each conductor, assuming instantaneous current flow towards the observer, is counterclockwise with the fluxes adding together and passing through the punchings 4 and 6 as shown by the arrows. A closed magnetic loop is formed between the pole portion 8 and the pole portion 12 by means of the stator frame 18 at the top of the figure while the rotor 20 closes the loop at the bottom of the figure. The flux path passes through the rotor 20 after leaving the pole face 13 across the rotor air gap and enters the pole face 9 across the same air gap, thus closing the magnetic loop, the flux path extending both axially and angularly. Similar magnetic loops are formed by opposite pole portions on the magnetic punchings 4 and 6 of each section 24. In a like manner, each section 26 of the auxiliary group has closed magnetic loops which are, however, rotated in position to lie in the interpolar space of an adjoining main section 24. It will be seen that the air gap flux pattern is essentially like that of a conventional motor and torque is developed in the same way.

It is to be understood that any number of sections 24 may be used in the main winding group and any number of sections 26 may be used in the auxiliary winding group. At the same time, any number of magnetic punchings 4 and 6 may be used and these punchings may even be of varying thickness. The reluctance on either side of the coil 2 in a given section 24 or 26, however, must be equal for a proper closed flux loop between opposite poles. Nor is it necessary that the main sections 24 and auxiliary sections 26 be alternated one with the other. It is within the contemplation of my invention that the group containing main winding sections 24 could be stacked adjacent each other and the group containing auxiliary sections 26 be likewise stacked with each group aligned one with the other. In any case the additive effect of the sections within the stator is such as to cause rotation of the rotor in the conventional manner. It is equally obvious that the coils could be applied by printed circuit techniques without using a separate strand or wire.

Figure 6:
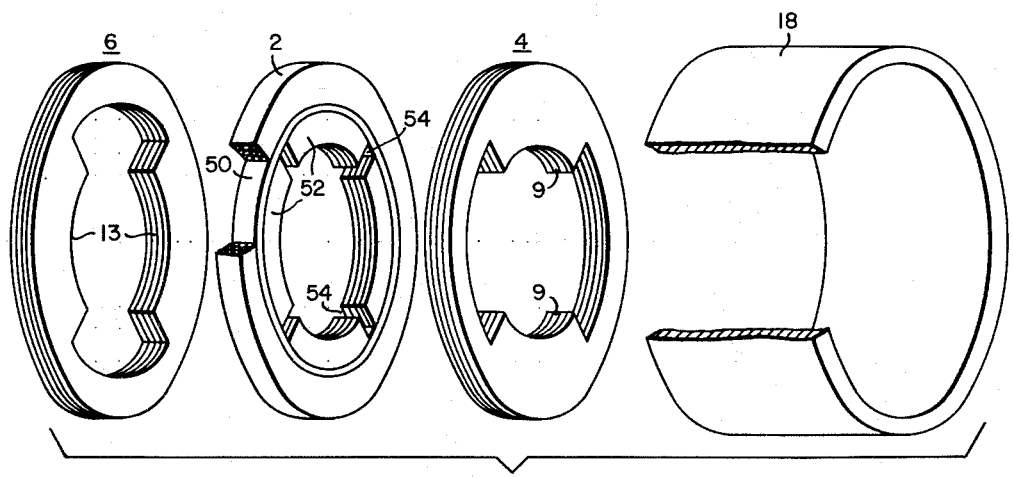
FIG. 6 is a diagrammatic view illustrating an alternate embodiment of my invention.
Figure 7:
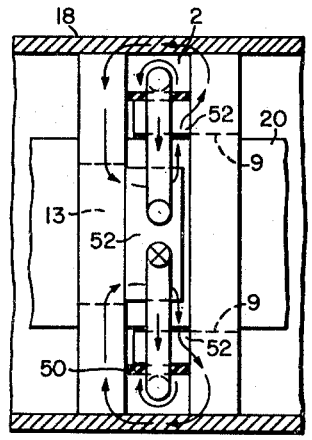
FIG. 7 is a further illustration of the flux paths in the alternate embodiment of FIG. 6.
Figure 8:
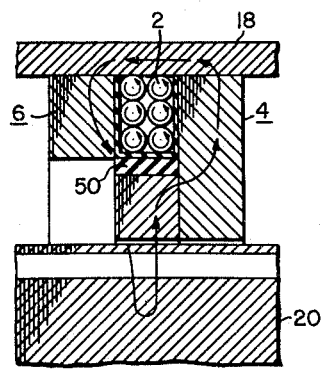
FIG. 8 is an enlarged fragmentary view of a portion of FIG. 6 and shows an area corresponding to the area shown in FIG. 5.

FIGS. 6, 7 and 8 show an alternate embodiment of my invention wherein the effective air gap flux is increased considerably with a resultant increase in efficiency.

In FIG. 6 a magnetic punching 4 and a magnetic punching 6 located on opposite sides of the coil 2 are formed in the same manner as previously described. A circular insulating strip 50, which is sufficiently rigid to support the winding or coil 2, also separates the magnetic punchings 4 and 6. The insulating strip 50 essentially replaces the insulation spacers 28 of FIG. 4. However, in FIG. 6, the space saved by replacing the insulating spacer 28 with the insulating strip 50 is utilized to create a more effective air gap flux.

Magnetic inserts or secondary punchings 52 are preferably spaced around the inside circumference of the insulating strip 50. A secondary punching 52 is inserted in the space within the winding 2 and alongside each pole face of a magnetic punching. Each secondary punching 52 extends alongside an extended pole face of a magnetic punching so that the pole face area of that particular pole portion is increased by the size of the inner face of the magnetic insert or secondary punching 52 adjacent thereto. In this way, more of the flux will effectively cross the air gap between the pole face and the rotor, with less flux leakage from the pole face, and with less reluctance in the magnetic path. Insertion of the secondary punchings 52 can be accomplished by bonding the punchings 52 to the insulating strip 50, as shown in FIG. 6, or any other suitable means may be used. The secondary punching 52 can be made integral with or secured to the proper magnetic punching 4 or 6 rather than secured to the strip 50 when desired.

Care must be taken, however, that the secondary punchings 52 do not short circuit the flux path so that flux does not pass through the rotor at all. In order to insure against this possibility, the secondary punchings 52 are made so as not to extend beyond the associated pole faces on the magnetic punching. At the same time, a reluctance gap indicated at 54 is provided by shortening the secondary punchings 52 so that the flux will not directly bridge between the magnetic pole pieces of opposite polarity. It is to be further noted that the secondary punchings are to be of a radial depth such that the flux will not pass from a secondary punching 52 to the undercut portion of the adjacent magnetic punchings on the other side of the coil 2, but rather from the secondary punching 52 to the rotor.

Of course, any means for increasing the pole face area of each pole face can be used so long as the flow of flux is in the desired manner. The pole face area can be increased by using a magnetic ring punching instead of secondary punchings 52. The solid magnetic ring would have reluctance slots or notches therein corresponding to the location of the reluctance gaps indicated at 54 in FIG. 6. Such a ring could be used based on the same factors of design as the secondary punchings 52. The reluctance slots would be of a depth compared to the total ring width to allow a bridge for structural connection of the ring. In this case, however, since there must be a reluctance at least equal to the reluctance of the rotor air gap between the undercut faces of the magnetic punchings and the magnetic ring punching, a section of insulating material of reluctance greater than the air gap would be necessarily placed on each side of the secondary punching ring to separate the punchings of opposite polarity from the secondary punching ring.

If desired, a further extension of the pole face area could be had for each pole portion by extending the secondary punchings over the pole undercut portion of the adjacent punchings of opposite polarity. Insulation would be used to separate the pole undercut portion from the extended pole faces located over the pole undercut portion. In such a manner, a solid pole face surface would be presented to the rotor for the entire motor section with the exception of the gaps 54.

A showing of the flux paths of the alternate embodiments of FIG. 6 is illustrated in FIG. 7 with a rotor 20 in position to close the flux loop. Because of the extension of the pole faces 9 and 13 of the magnetic punchings 4 and 6, respectively, by means of the secondary punchings 52, the flow of magnetic flux is somewhat altered from the flow shown in FIG. 2. The magnetic flux need not travel the lengthy axial distance in the rotor 20 as in FIG. 2 but instead travels a good portion of the necessary axial distance via the extension of the pole portions 8 and 12 by the secondary punchings 52. The larger pole face area provided by the addition of the secondary punchings 52 greatly reduces the flux leakage, thereby increasing the efficiency of the machine.

FIG. 8 is similar to FIG. 5 with the exception that the magnetic insert or secondary punching 52 is shown with the annular insulating strip 50. The insulating strip 50 furnishes means for supporting the spiral coil 2 of conductor material which is wound between the magnetic punchings 4 and 6. For purposes of clarity, the pole portion 12 has not been rotated 90 mechanical degrees as had been done in FIG. 5 but has been shown in its proper position in FIG. 7. It is to be understood however, that the magnetic punching 6 has a pole portion 12 and a pole face 13 with an associated secondary punching 52 which is located 90 mechanical degrees in angular position from a pole face 9 of opposite polarity for the illustrated four-pole machine. From FIG. 8, it can be seen that the axial path in the rotor of the closed flux loop has been greatly reduced by essentially overlapping the pole faces 9 and 13. The closed flux loop is once again established by the stator frame 18 and the rotor 20 by bridging the magnetic punchings 4 and 6 via the rotor air gap.

It is readily apparent that my invention has, through the elimination of conventional end turns, also eliminated the electrical losses associated therewith which detract from the performance of the conventional machine. The connection of the windings of each pole in the conventtional machine and the taping of the connections has been eliminated through the use of a single conductor for the main winding and a single conductor for the auxiliary winding. The varnish dip and baking required in conventional motors has also been eliminated, while the winding operation is greatly simplified. The result is fewer steps in the manufacture of the dynamo-electric machine and reduced cost. Material costs have been greatly reduced by reason of reducing the space required for ineffective conductor material which, in turn, allows a reduction of all other materials within the machine.

My invention lends itself to production by automation methods. A printed circuit section for each coil 2 can easily be inserted between the magnetic punchings 4 and 6, and by stacking the required number of alternate sections, each containing a printed coil circuit, a motor of any horsepower rating can be obtained. Should starting torque not be required, then, of course, the auxiliary sections 26 can be eliminated. Should a multiple phase motor be desired, the motor sections would be stacked in multiple groups with the sections of each group angularly displaced by the appropriate number of electrical degrees. The electrical winding for each phase or group would be brought out of the motor for connection in any desired manner.

While my invention has been described with a certain degree of particularity for the purpose of illustration, it is to be understood that all other embodiments, equivalents and alterations within the spirit and scope of my invention are herein meant to be included.

I claim as my invention:

1. A dynamoelectric machine having a stator member and a rotor member, the stator member including a plurality of axially aligned sections, each of said sections comprising a pair of annular core members, each of said core members having pole portions extending radially inward to form a small air gap with the rotor member, the pole portions of one core member being angularly displaced from the pole portions of the other core member, and an annular winding disposed in a radial plane between the core members.

2. A dynamoelectric machine having a stator member and a rotor member, the stator member including a plurality of axially aligned sections, each of said sections comprising a pair of laminated annular core members, each of said core members having at least one pole portion extending radially inward to form a small air gap with the rotor member, the pole portions of one core member being angularly displaced from the pole portions of the other core member, and an annular winding disposed in a radial plane between the core members, the pole portions of like polarity of all the sections being in axial alignment.

3. A single-phase electric motor having a stator member and a rotor member, the stator member including two groups of axially aligned sections, each of said sections comprising a pair of annular core members, each of said core members having pole portions extending radially inward to form a small air gap with the rotor member, the pole portions of one core member being angularly displaced from the pole portions of the other core member, and an annular winding disposed in a radial plane between the core members, the pole portions of like polarity of one group of sections being axially aligned and the pole portions of like polarity of the other group of sections being axially aligned and angularly displaced frm the pole portions of the first group of sections, and means for electrically connecting the windings of the two groups of sections in separate circuits.

4. A single-phase electric motor having a stator member and a rotor member, the stator member including two groups of axially aligned sections, each of said sections comprising a pair of laminated annular core members, each of said core members having at least one pole portion extending radially inward to form a small air gap with the rotor member, the pole portions of one core member being angularly displaced from the pole portions of the other core member, and an annular winding disposed in a radial plane between the core members, the pole portions of like polarity of one group of sections being axially aligned and the pole portions of like polarity of the other group of sections being axially aligned and angularly displaced from the pole portions of the first group of sections, and means for electrically connecting the windings of the two groups of sections in separate circuits.

5. A dynamoelectric machine having a stator member and a rotor member, the stator member including a plurality of axially aligned sections, each of said sections comprising a pair of laminated annular core members, each of said core members having at least one pole portion extending radially inward to form a small air gap with the rotor member, the pole portions of one core member being angularly displaced from the pole portions of the other core member, and an annular winding disposed in a radial plane between the core members, pole portions of like polarity being in axial alignment, and magnetic members disposed within the annular windings and in axial alignment with the adjacent pole portions.

References Cited in the file of this patent

UNITED STATES PATENTS

| | | |
|---|---|---|
| 1,028,985 | Behrend | June 11, 1912 |
| 2,466,267 | Pace | Apr. 5, 1949 |

FOREIGN PATENTS

| | | |
|---|---|---|
| 93,413 | Switzerland | Nov. 24, 1919 |
| 269,760 | Germany | Jan. 31, 1914 |